US011263841B2

(12) United States Patent
Gale et al.

(10) Patent No.: US 11,263,841 B2
(45) Date of Patent: *Mar. 1, 2022

(54) DATA STORAGE LIBRARY WITH SERVICE MODE

(71) Applicant: International Business Machines Corporation, Armonk, NY (US)

(72) Inventors: Ernest S. Gale, Tucson, AZ (US); Icko E. T. Iben, Santa Clara, CA (US); Leonard G. Jesionowski, Tucson, AZ (US); James M. Karp, Tucson, AZ (US); Michael P. McIntosh, Tucson, AZ (US); Shawn M. Nave, Tucson, AZ (US); Lee C. Randall, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 69 days.

This patent is subject to a terminal disclaimer.

(21) Appl. No.: 16/597,469

(22) Filed: Oct. 9, 2019

(65) Prior Publication Data
US 2020/0043263 A1 Feb. 6, 2020

Related U.S. Application Data

(60) Continuation of application No. 16/443,150, filed on Jun. 17, 2019, now Pat. No. 10,490,004, which is a
(Continued)

(51) Int. Cl.
*G07C 9/00* (2020.01)
*G11B 23/28* (2006.01)
(Continued)

(52) U.S. Cl.
CPC .......... *G07C 9/00174* (2013.01); *G11B 15/68* (2013.01); *G11B 23/287* (2013.01);
(Continued)

(58) Field of Classification Search
CPC . G11B 23/287; G11B 23/021; G11B 23/0236; G11B 33/02; G07C 9/00174
See application file for complete search history.

(56) References Cited

U.S. PATENT DOCUMENTS

| 4,831,476 A | 5/1989 | Pisczak |
| 4,838,911 A | 6/1989 | Robertson |

(Continued)

FOREIGN PATENT DOCUMENTS

| CN | 102192631 A | 9/2011 |
| CN | 102407663 A | 4/2012 |

(Continued)

OTHER PUBLICATIONS

Frachtenberg E. et al., "Thermal Design in the Open Compute Datacenter", Thermal and Thermomechanical Phenomena in Electronic Systems (ITherm), 13th IEEE I22012 (May 30-Jun. 1, 2012).
(Continued)

*Primary Examiner* — Thomas D Alunkal
(74) *Attorney, Agent, or Firm* — Scully, Scott, Murphy & Presser, P.C.

(57) ABSTRACT

A data storage library system includes a data storage library having at least one library frame, at least one environmental conditioning unit associated with the data storage library and configured to control one or more interior environmental conditions within the at least one library frame, and at least one access door for providing access to an interior portion of the at least one library frame. The system also includes a library controller configured to initiate a service mode prior to and/or during a service procedure performed within the at least one library frame, wherein the service mode comprises configuring the at least one environmental conditioning unit to adjust the one or more environmental conditions within the at least one library frame toward one or more exterior environmental conditions outside of the data storage library.
(Continued)

Optionally, a lock and/or indicator (visual and/or audible) may control access to the interior of the library frames. Associated methods of servicing a data storage library are disclosed.

20 Claims, 8 Drawing Sheets

Related U.S. Application Data division of application No. 15/460,403, filed on Mar. 16, 2017, now Pat. No. 10,417,851.

(51) Int. Cl.
G11B 33/14 (2006.01)
G11B 15/68 (2006.01)
G11B 23/02 (2006.01)
G11B 23/023 (2006.01)

(52) U.S. Cl.
CPC ............ *G11B 33/14* (2013.01); *G11B 23/021* (2013.01); *G11B 23/0236* (2013.01)

(56) References Cited

U.S. PATENT DOCUMENTS

| | | | |
|---|---|---|---|
| 5,278,708 A | 1/1994 | Apple et al. | |
| 5,449,229 A | 9/1995 | Aschenbrenner et al. | |
| 5,940,354 A | 8/1999 | Inoue | |
| 6,347,020 B1 | 2/2002 | Carpenter et al. | |
| 6,366,982 B1 | 4/2002 | Suzuki et al. | |
| 6,409,450 B1 | 6/2002 | Ostwald et al. | |
| 6,457,928 B1 | 10/2002 | Ryan | |
| 6,467,285 B2 | 10/2002 | Felder et al. | |
| 6,478,524 B1 | 11/2002 | Malin | |
| 6,494,663 B2 | 12/2002 | Ostwald et al. | |
| 6,537,013 B2 | 3/2003 | Emberty et al. | |
| 6,563,771 B1 | 5/2003 | Debiez | |
| 6,661,596 B2 | 12/2003 | Chliwnyj et al. | |
| 6,676,026 B1 | 1/2004 | McKinley et al. | |
| 6,676,505 B2 | 1/2004 | Behl | |
| 6,854,275 B2 | 2/2005 | Evans | |
| 6,896,612 B1 | 5/2005 | Novotny et al. | |
| 6,924,981 B2 | 8/2005 | Chu et al. | |
| 6,940,716 B1 | 9/2005 | Korinsky et al. | |
| 7,039,924 B2 | 5/2006 | Goodman et al. | |
| 7,106,538 B2 | 9/2006 | Minemura et al. | |
| 7,277,247 B2 | 10/2007 | Hoshino | |
| 7,434,412 B1 | 10/2008 | Miyahira | |
| 7,474,497 B2 | 1/2009 | Jesionowski et al. | |
| 7,635,246 B2 | 12/2009 | Neeper et al. | |
| 7,656,602 B2* | 2/2010 | Iben ..................... | G11B 5/3106 360/66 |
| 7,656,660 B2 | 2/2010 | Hoeft et al. | |
| 7,746,634 B2 | 6/2010 | Hom et al. | |
| 7,751,188 B1 | 7/2010 | French et al. | |
| 7,961,419 B2 | 6/2011 | Suzuki et al. | |
| 8,051,671 B2 | 11/2011 | Vinson et al. | |
| 8,141,621 B2 | 3/2012 | Campbell et al. | |
| 8,151,046 B2 | 4/2012 | Suzuki et al. | |
| 8,154,870 B1 | 4/2012 | Czamara et al. | |
| 8,206,976 B2 | 6/2012 | Kobayashi et al. | |
| 8,209,993 B2 | 7/2012 | Carlson et al. | |
| 8,210,914 B2 | 7/2012 | McMahan et al. | |
| 8,456,840 B1 | 6/2013 | Clidaras et al. | |
| 8,514,513 B2 | 8/2013 | Hori | |
| 8,544,289 B2 | 10/2013 | Johnson et al. | |
| 8,675,303 B2 | 3/2014 | Compton et al. | |
| 8,694,152 B2* | 4/2014 | Cyrulik ............... | B65G 1/1373 700/214 |
| 8,789,384 B2 | 7/2014 | Eckberg et al. | |
| 8,849,784 B2 | 9/2014 | Alber et al. | |
| 8,857,208 B2 | 10/2014 | Malin | |
| 8,939,524 B2 | 1/2015 | Gasser | |
| 8,974,274 B2 | 3/2015 | Carlson | |
| 9,025,275 B1 | 5/2015 | Manes et al. | |
| 9,043,035 B2 | 5/2015 | Chainer et al. | |
| 9,069,534 B2 | 6/2015 | Rogers | |
| 9,110,641 B2 | 8/2015 | Wu | |
| 9,155,230 B2 | 10/2015 | Eriksen et al. | |
| 9,190,112 B1 | 11/2015 | Bayang et al. | |
| 9,240,209 B1 | 1/2016 | Crawford et al. | |
| 9,255,936 B2 | 2/2016 | Hunt et al. | |
| 9,291,408 B2 | 3/2016 | Iyengar et al. | |
| 9,321,136 B2 | 4/2016 | Eckberg et al. | |
| 9,361,921 B2 | 6/2016 | Herget | |
| 9,368,148 B2 | 6/2016 | Starr et al. | |
| 9,433,122 B2 | 8/2016 | Ohba et al. | |
| 9,642,286 B1 | 5/2017 | Gutierrez et al. | |
| 9,888,615 B1 | 2/2018 | Frink et al. | |
| 9,916,869 B1 | 3/2018 | Gavillan et al. | |
| 9,916,871 B1 | 3/2018 | Gavillan et al. | |
| 9,940,976 B1 | 4/2018 | Gale et al. | |
| 9,949,410 B1 | 4/2018 | Kowalski et al. | |
| 10,004,165 B1 | 6/2018 | Bailey et al. | |
| 10,026,445 B1* | 7/2018 | Gale .................... | G11B 23/021 |
| 10,026,455 B1 | 7/2018 | Gavillan et al. | |
| 10,045,457 B1 | 8/2018 | Gavillan et al. | |
| 10,276,214 B2 | 4/2019 | Gavillan et al. | |
| 10,303,376 B2 | 5/2019 | Gavillan et al. | |
| 10,395,695 B2 | 8/2019 | Gavillan et al. | |
| 10,417,851 B2* | 9/2019 | Gale ...................... | G11B 15/68 |
| 10,418,063 B2* | 9/2019 | Gale ...................... | G11B 33/02 |
| 10,418,071 B2 | 9/2019 | Gale et al. | |
| 10,431,254 B2 | 10/2019 | Gavillan et al. | |
| 10,490,004 B2* | 11/2019 | Gale .................. | G07C 9/00174 |
| 10,679,666 B2* | 6/2020 | Gale .................... | G11B 23/021 |
| 2002/0023444 A1 | 2/2002 | Felder et al. | |
| 2002/0098064 A1 | 7/2002 | Ostwald et al. | |
| 2003/0039056 A1 | 2/2003 | Satoh | |
| 2003/0197619 A1 | 10/2003 | Lawrence et al. | |
| 2004/0025515 A1 | 2/2004 | Evans | |
| 2004/0080244 A1 | 4/2004 | Lowther, Jr. et al. | |
| 2004/0145468 A1 | 7/2004 | La et al. | |
| 2004/0153386 A1 | 8/2004 | Eckerdt | |
| 2004/0165358 A1 | 8/2004 | Regimbal et al. | |
| 2004/0264042 A1 | 12/2004 | Pollard et al. | |
| 2005/0057847 A1 | 3/2005 | Armagost et al. | |
| 2005/0170770 A1 | 8/2005 | Johnson et al. | |
| 2005/0185323 A1 | 8/2005 | Brace et al. | |
| 2005/0270727 A1 | 12/2005 | Shih | |
| 2006/0177922 A1 | 8/2006 | Shamah et al. | |
| 2006/0250578 A1 | 11/2006 | Pohl et al. | |
| 2006/0259195 A1 | 11/2006 | Eliuk et al. | |
| 2006/0262447 A1 | 11/2006 | Hoshino | |
| 2007/0180278 A1 | 8/2007 | Botchek | |
| 2007/0250410 A1 | 10/2007 | Brignone et al. | |
| 2008/0043371 A1 | 2/2008 | Konshak | |
| 2008/0061138 A1 | 3/2008 | Fisher et al. | |
| 2008/0065903 A1 | 3/2008 | Goodman et al. | |
| 2008/0094797 A1 | 4/2008 | Coglitore et al. | |
| 2008/0106368 A1* | 5/2008 | Vitier ..................... | E04H 3/06 340/5.5 |
| 2008/0151491 A1 | 6/2008 | Baldwin et al. | |
| 2008/0231152 A1 | 9/2008 | Malin | |
| 2009/0046427 A1 | 2/2009 | Noteboom et al. | |
| 2009/0061758 A1 | 3/2009 | Yeung et al. | |
| 2009/0168345 A1 | 7/2009 | Martini | |
| 2009/0266511 A1 | 10/2009 | Yang | |
| 2010/0078492 A1 | 4/2010 | Cislo | |
| 2010/0170277 A1 | 7/2010 | Schmitt | |
| 2010/0188810 A1 | 7/2010 | Andersen et al. | |
| 2010/0249987 A1 | 9/2010 | Hong et al. | |
| 2010/0254241 A1 | 10/2010 | Aoki | |
| 2010/0311317 A1 | 12/2010 | McReynolds et al. | |
| 2011/0022771 A1 | 1/2011 | Foerster | |
| 2011/0083824 A1 | 4/2011 | Rogers | |
| 2011/0108207 A1 | 5/2011 | Mainers et al. | |
| 2011/0231007 A1 | 9/2011 | Biehle et al. | |
| 2012/0046792 A1 | 2/2012 | Secor | |
| 2012/0155027 A1 | 6/2012 | Broome et al. | |
| 2012/0305042 A1 | 12/2012 | Lorbiecki | |
| 2013/0031928 A1 | 2/2013 | Kim | |

(56) References Cited

U.S. PATENT DOCUMENTS

| | | |
|---|---|---|
| 2013/0088833 A1 | 4/2013 | Cox et al. |
| 2013/0128455 A1 | 5/2013 | Koblenz et al. |
| 2013/0244563 A1 | 9/2013 | Noteboom et al. |
| 2014/0019768 A1 | 1/2014 | Pineau et al. |
| 2014/0059946 A1 | 3/2014 | Gardner et al. |
| 2014/0206271 A1 | 7/2014 | Iganacio |
| 2014/0238639 A1 | 8/2014 | Ambriz et al. |
| 2014/0277765 A1 | 9/2014 | Karimi et al. |
| 2014/0290162 A1 | 10/2014 | Tanimoto |
| 2014/0293471 A1 | 10/2014 | Sakuma |
| 2015/0036293 A1 | 2/2015 | Martini |
| 2015/0086305 A1 | 3/2015 | Ostwald et al. |
| 2015/0088319 A1 | 3/2015 | Dasari et al. |
| 2015/0106654 A1 | 4/2015 | Foster et al. |
| 2015/0167996 A1 | 6/2015 | Fadell et al. |
| 2015/0179210 A1 | 6/2015 | Ostwald et al. |
| 2015/0203297 A1* | 7/2015 | Manning ............... B65G 1/045 700/218 |
| 2015/0208554 A1 | 7/2015 | Leigh et al. |
| 2015/0269641 A1 | 9/2015 | Roy |
| 2015/0294525 A1 | 10/2015 | Broom et al. |
| 2016/0094898 A1 | 3/2016 | Primm et al. |
| 2016/0107312 A1 | 4/2016 | Morrill et al. |
| 2016/0109389 A1 | 4/2016 | Suzuki et al. |
| 2016/0112245 A1 | 4/2016 | Mankovskii |
| 2016/0117126 A1 | 4/2016 | DeSpiegeleer et al. |
| 2016/0223455 A1 | 8/2016 | Minegishi |
| 2016/0240061 A1 | 8/2016 | Li et al. |
| 2016/0302332 A1 | 10/2016 | Anderson et al. |
| 2017/0010015 A1 | 1/2017 | Jan |
| 2017/0064876 A1 | 3/2017 | Leckelt et al. |
| 2017/0154483 A1 | 6/2017 | Cordiner et al. |
| 2017/0275012 A1 | 9/2017 | Tretow et al. |
| 2017/0323666 A1 | 11/2017 | Jesionowski et al. |
| 2017/0347496 A1 | 11/2017 | Smith |
| 2018/0077819 A1 | 3/2018 | Roy |
| 2018/0155975 A1 | 6/2018 | Kempfle |
| 2018/0172304 A1 | 6/2018 | Wolfson |
| 2018/0184548 A1 | 6/2018 | Frink et al. |
| 2018/0267581 A1 | 9/2018 | Gavillan et al. |
| 2018/0267717 A1 | 9/2018 | Miranda Gavillan et al. |
| 2018/0267718 A1 | 9/2018 | Gale et al. |
| 2018/0268860 A1 | 9/2018 | Gavillan et al. |
| 2018/0268861 A1 | 9/2018 | Gavillan |
| 2018/0268873 A1 | 9/2018 | Gavillan |

FOREIGN PATENT DOCUMENTS

| | | |
|---|---|---|
| CN | 102881313 A | 1/2013 |
| CN | 204361533 U | 5/2015 |
| JP | 11-287499 A | 10/1999 |
| JP | 2001-93121 A | 4/2001 |
| JP | 2001-307474 A | 11/2001 |
| JP | 2009-87518 A | 4/2009 |
| JP | 2011-191207 A | 9/2011 |
| WO | 2007/099542 A2 | 9/2007 |
| WO | 2008/14578 A1 | 2/2008 |
| WO | 2009/134610 A2 | 11/2009 |
| WO | 2010/067443 A1 | 6/2010 |

OTHER PUBLICATIONS

Hanaoka Y. et al., "Technologies for Realizing New ETERNUS LT270 High-End Tape Library System", FUJITSU Sci. Tech. J. 42(1):24-31 (Jan. 2006).

Lee S. et al., "Thermoelectric-Based Sustainable Self-Cooling for Fine-Grained Processor Hot Spots", 15th IEEE ITHERM Conference pp. 847-856 (May 31-Jun. 3, 2016).

Mccormick-Goodhart M.H. et al., "The Design and Operation of a Passive Humidity-Controlled Cold Storage Vault Using Conventional Freezer Technology and Moisture-Sealed Cabinets", IS&T's 2004 Archiving Conference, San Antonio, Texas (Apr. 20-23, 2005).

Oga S. et al., Indirect External Air Cooling Type Energy-Saving Hybrid Air Conditioner for Data Centers, "F-COOL NEO", Fuji Electric Review 60(1):59-64 (Mar. 30, 2014).

Ouchi M. et al., "Thermal Management Systems for Data Centers With Liquid Cooling Technique of CPU",13th IEEE ITHERM Intersociety Conference pp. 790-798 (May 30-Jun. 1, 2012).

Rasmussen N., "Cooling Options for Rack Equipment With Side-to-Side Airflow", www.apc.com (2004).

Disclosed Anonymously, ip.com, "Method for a Direct Air Free Cooling With a Real Time Hygrometry Regulation for Data Center", IPCOM000200312D, pp. 1-3 (Oct. 5, 2010).

Authors: IBM, "Energy Efficient Cooling System for Data Center", IPCOM000182040D, pp. 1-4 (Apr. 23, 2009).

List of IBM Patents or Patent Applications Treated as Related dated Nov. 27, 2019.

Office Action dated Jan. 29, 2021 received in U.S. Appl. No. 16/557,099.

List of IBM Patents or Patent Applications Treated as Related Dated Mar. 1, 2021, 3 Pages.

Office Action dated Feb. 14, 2020 received in U.S. Appl. No. 15/460,429, 8 pages total.

Office Action dated Aug. 5, 2020 received in U.S. Appl. No. 16/557,099, 47 pages.

Office Action dated Jul. 16, 2021 received in a related U.S. Patent Application, namely U.S. Appl. No. 16/715,516.

Office Action dated Dec. 24, 2021 received in a related U.S. Patent Application, namely U.S. Appl. No. 16/718,526.

* cited by examiner

DATA STORAGE LIBRARY WITH SERVICE MODE

CROSS-REFERENCE TO RELATED APPLICATIONS

This patent document claims priority to, and is a continuation of U.S. patent application Ser. No. 16/443,150, filed Jun. 17, 2019 which is a divisional of, U.S. patent application Ser. No. 15/460,403, filed Mar. 16, 2017, now U.S. Pat. No. 10,417,851 issued Sep. 17, 2019. The disclosure of the priority application is fully incorporated by reference.

BACKGROUND

The present disclosure relates to a data storage library for the storage and transfer of data, and more specifically, to a data storage library capable of entering a distinct service mode when one or more components within the data storage library are in need of service, replacement, or both.

Automated data storage libraries are known for providing cost effective storage and retrieval of large quantities of data. The data in automated data storage libraries is typically stored on media of data storage cartridges that are, in turn, stored at storage slots or the like inside the library in a fashion that renders the media, and its resident data, accessible for physical retrieval. Such data storage cartridges are commonly termed "removable media." Data storage cartridge media may comprise any type of media on which data may be stored and which may serve as removable media, including but not limited to magnetic media (such as magnetic tape or disks), optical media (such as optical tape or disks), electronic media (such as PROM, EEPROM, flash PROM, COMPACTFLASH™, SMARTMEDIA™, MEMORY STICK™, etc.), or other suitable media. An example of a data storage cartridge that is widely employed in automated data storage libraries for mass data storage is a magnetic tape cartridge.

In addition to data storage media, automated data storage libraries typically comprise data storage drives that store data to, and/or retrieve data from, the data storage cartridge media. Further, automated data storage libraries typically comprise I/O stations at which data storage cartridges are supplied or added to, or removed from, the library. The transport of data storage cartridges between data storage slots, data storage drives, and I/O stations is typically accomplished by one or more robotic accessors. Such accessors have grippers for physically retrieving the selected data storage cartridges from the storage slots within the automated data storage library and transporting such cartridges to the data storage drives by moving, for example, in the horizontal (X) and vertical (Y) directions.

In an effort to increase storage capacity, deep slot technology allows for storage cells that contain more than a single data storage cartridge. Such storage libraries allow for higher density, or more cartridges stored per square foot. In "deep slot" libraries, two or more cartridges may be stored in a multi-cartridge deep slot cell, arrayed in series, one behind the other, in tiers ranging from a front-most tier to a rearmost tier.

SUMMARY

In accordance with an aspect of the disclosure, a data storage library system is disclosed, the system including a data storage library, the data storage library comprising at least one library frame, at least one environmental conditioning unit associated with the data storage library and configured to control one or more interior environmental conditions within the at least one library frame, and at least one access door for providing access to an interior portion of the at least one library frame. The system also includes a library controller, wherein the library controller is configured to initiate a service mode prior to and during a service procedure performed within the at least one library frame, and further wherein the service mode includes configuring the at least one environmental conditioning unit to adjust the one or more environmental conditions within the at least one library frame toward one or more exterior environmental conditions outside of the data storage library during the service mode.

According to another aspect of the disclosure, a system is disclosed, the system including a data storage library, at least one environmental conditioning unit associated with the data storage library and configured to control one or more interior environmental conditions within the data storage library, and at least one access door for providing access to an interior portion of the data storage library. The system also includes a library controller and at least one lock associated with the at least one access door and in electronic communication with the library controller, wherein the library controller is configured to initiate a service mode prior to and during a service procedure performed within the data storage library, wherein the service mode includes configuring the at least one lock to prevent access into the at least one access door, and configuring the at least one environmental conditioning unit to adjust the one or more environmental conditions within the at least one library frame toward one or more exterior environmental conditions outside of the data storage library.

In accordance with another aspect of the disclosure, a method of servicing a data storage library is disclosed, the method including providing a data storage library having at least one library frame, providing at least one environmental conditioning unit configured to control at least one environmental condition within the at least one library frame, and initiating a service mode prior to and during a service procedure being performed within the at least one library frame. The method also includes adjusting at least one environmental condition within the at least one library frame toward at least one external environmental condition outside of the data storage library, determining if a differential between the at least one environmental condition within the at least one library frame and the at least one external environmental condition outside of the data storage library is within a desired range, and allowing access into the interior of the at least one library frame if the differential is within the desired range.

DETAILED DESCRIPTION

The following description is made for the purpose of illustrating the general principles of the present disclosure and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

Efforts to improve the performance of traditional data centers attempt to minimize the cost of processing and storing data. One option that is employed to reduce operational costs of datacenters is to run the equipment in the datacenter at the high end of its environmental operational limits, thereby allowing for cooling of the datacenter to be reduced. In other words, datacenters are running increasingly hot and more humid conditions than traditional datacenters in an attempt to reduce operating costs. Although this strategy may be effective when applied to disk and/or flash data storage environments, magnetic tape is more susceptible to degradation when exposed to these unfavorable conditions. Therefore, this option is not available for magnetic data storage libraries.

In an effort to control the environment within magnetic data storage libraries so as to provide suitable working conditions for magnetic tape media, data storage drives, etc., air conditioning units may be incorporated into the data storage libraries themselves. While these air conditioning units effectively control the temperature and humidity within the data storage libraries, the environmental conditions of the area surrounding the data storage libraries remain largely unchanged, with conditions often being higher in both temperature and humidity. While this may allow a datacenter to operate at reduced costs, it may also result in a marked temperature differential between the interior and exterior environments of the data storage libraries. Such a temperature differential may prove problematic during service of the data storage library and/or replacement of data storage library components such as data storage cartridges, data storage drives, etc., as condensation may develop on cartridges and other service parts during their service, installation, and/or removal from the data storage library. Condensation accumulation on such sensitive componentry may cause component damage, up to and including component failure and/or data loss.

Figure 1A:
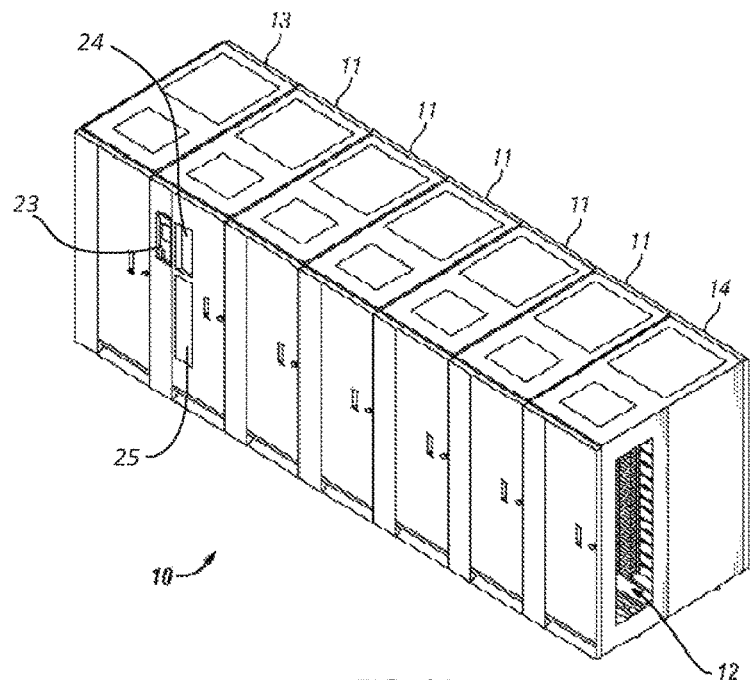
FIG. 1A is a perspective view of one embodiment of an automated data storage library.
Figure 1B:
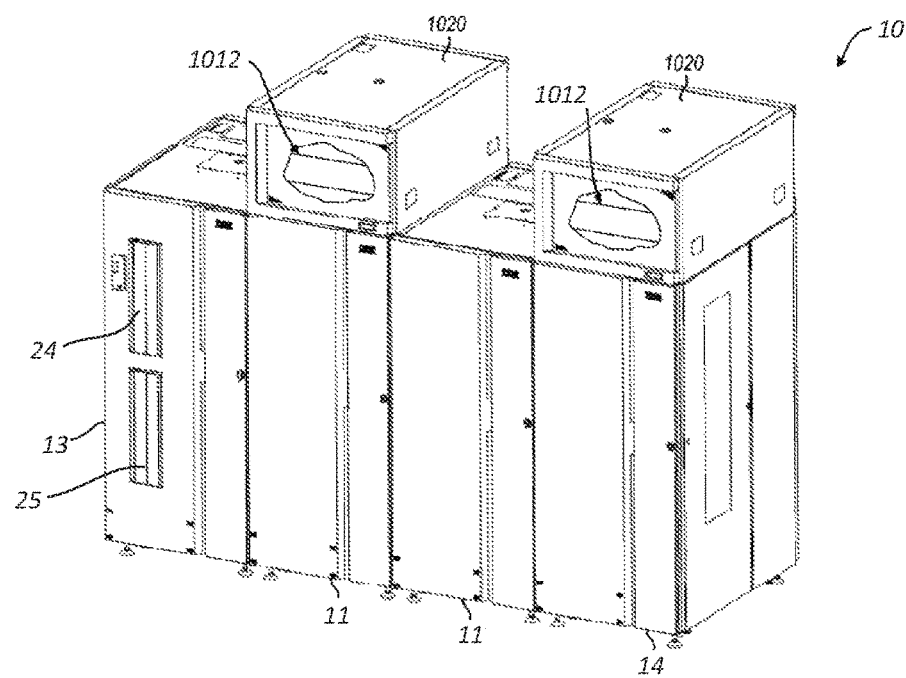
FIG. 1B is a perspective view of another embodiment of an automated data storage library
Figure 2:
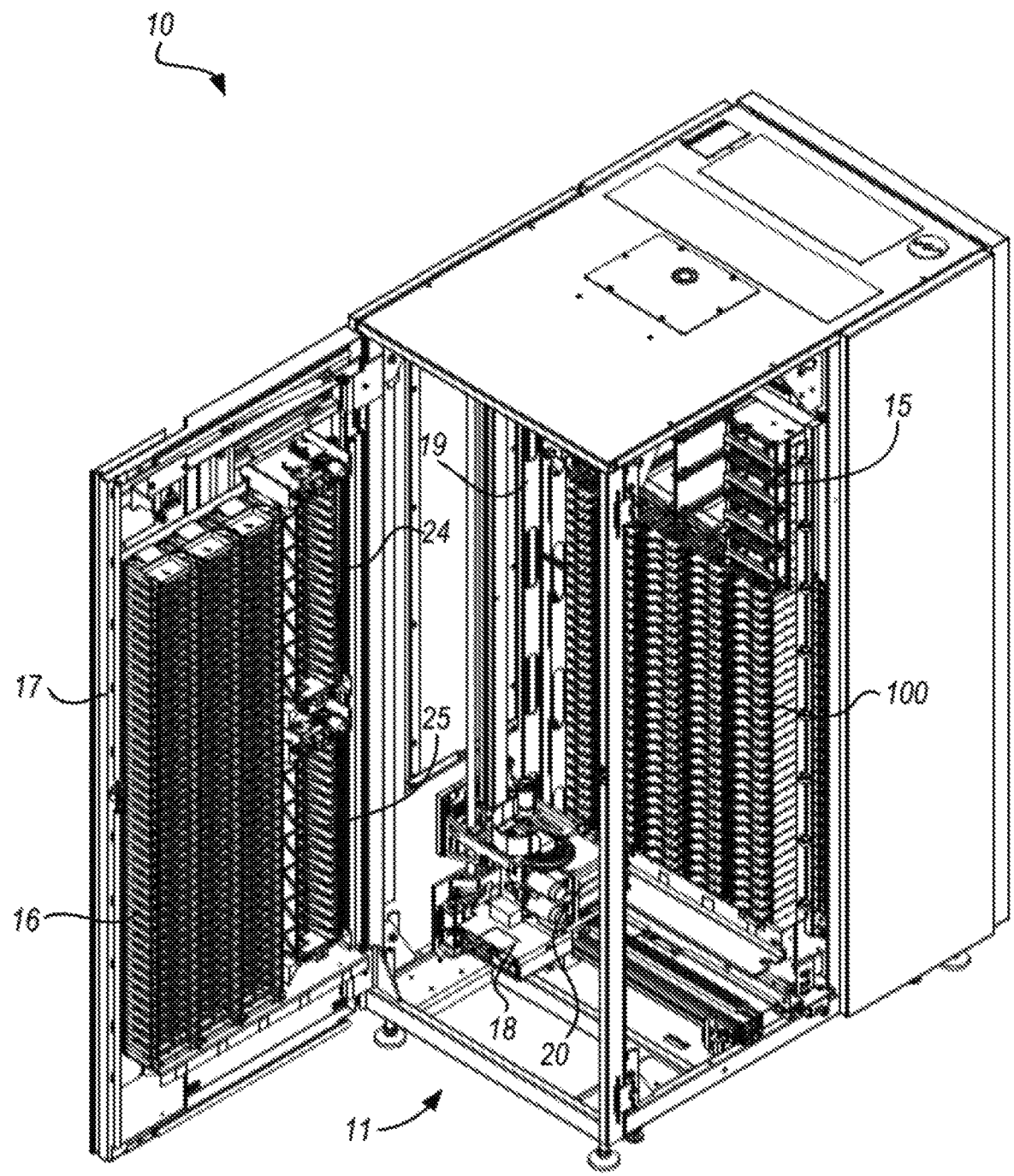
FIG. 2 is a perspective view of a storage frame from the data storage library of FIG. 1.

FIGS. 1A & 1B and FIG. 2 illustrate an example of a data storage system, e.g., an automated data storage library 10 which stores and retrieves data storage cartridges, containing data storage media (not shown), from multi-cartridge deep slot storage cells 100 and single cartridge storage slots 16. Examples of an automated data storage library which has a similar configuration as that depicted in FIG. 1A and FIG. 2, and may be implemented with some of the various approaches herein may include IBM TS4500 Library or the IBM 3584 UltraScalable Tape Library.

The library 10 in the embodiment of FIG. 1A comprises a left hand service bay 13, one or more storage frames 11, and right hand service bay 14. The library 10 of FIG. 1B comprises a left handed service bay 13, one or more storage frames 11, a right handed service bay 14 and optional environmental conditioning units 1012 which may control the temperature, humidity and/or other environmental conditions in the interior of the library 10. While two environmental conditioning units are shown in FIG. 1B, it will be appreciated that more or less environmental conditioning units 1012 may be associated with the library, and in circumstances the library may have no environmental conditioning units. As will be discussed in further detail below, a frame may comprise an expansion component of the library. Thus, storage frames may be added or removed to expand or reduce the size and/or functionality of the library. According to different approaches, frames may include additional storage slots, deep storage slot cells, drives, import/export stations, accessors, operator panels, controller cards, communication cards, etc. Moreover, an accessor aisle 12 preferably extends between the storage frames and bays of the embodiments in FIGS. 1A & 1B thereby allowing an accessor to move between frames.

FIG. 2 shows an exemplary embodiment of a storage frame 11, which may act as the base frame of the library 10. The storage frame 11 illustrated in FIG. 2 may have only a single accessor 18 (i.e., there are no redundant accessors) and no service bay. However, in other embodiments, a storage frame may include multiple robotic accessors and/or service bays.

Looking to FIG. 2, the library 10 is arranged for accessing data storage media in response to commands from at least one external host system (not shown). The library 10 includes a plurality of storage slots 16 on front door 17 and a plurality of multi-cartridge deep slot cells 100 on rear wall 19, both of which may be used for storing data storage cartridges that may contain data storage media. According to one approach, the storage slots 16 are configured to store a single data storage cartridge, and the multi-cartridge deep slot cells 100 are configured to store a plurality of data storage cartridges. The arrangement and positioning of the storage slots 16 and the deep slot cells 100 may be different than illustrated in FIG. 2.

With continued reference to FIG. 2, the storage frame 11 of the library 10 also includes at least one data storage drive 15, e.g., for reading and/or writing data with respect to the data storage media in the data storage cartridges. Additionally, a first accessor 18 may be used to transport data storage cartridges containing data storage media between the plurality of storage slots 16, the multi-cartridge deep slot cells 100, and/or the data storage drive(s) 15. According to various approaches, the data storage drives 15 may be optical disk drives, magnetic tape drives, or other types of data storage drives that are used to read and/or write data with respect to the data storage media.

As illustrated, the storage frame 11 may optionally include an operator panel or other user interface, such as a web-based interface, which allows a user to interact with the library 10. Optionally, the library 10 may have an associated software application having a user interface, which also allows a user to interact with the library 10. The software application may be executable on a computing device, a remote server, a cloud or a mobile device.

Figure 3:
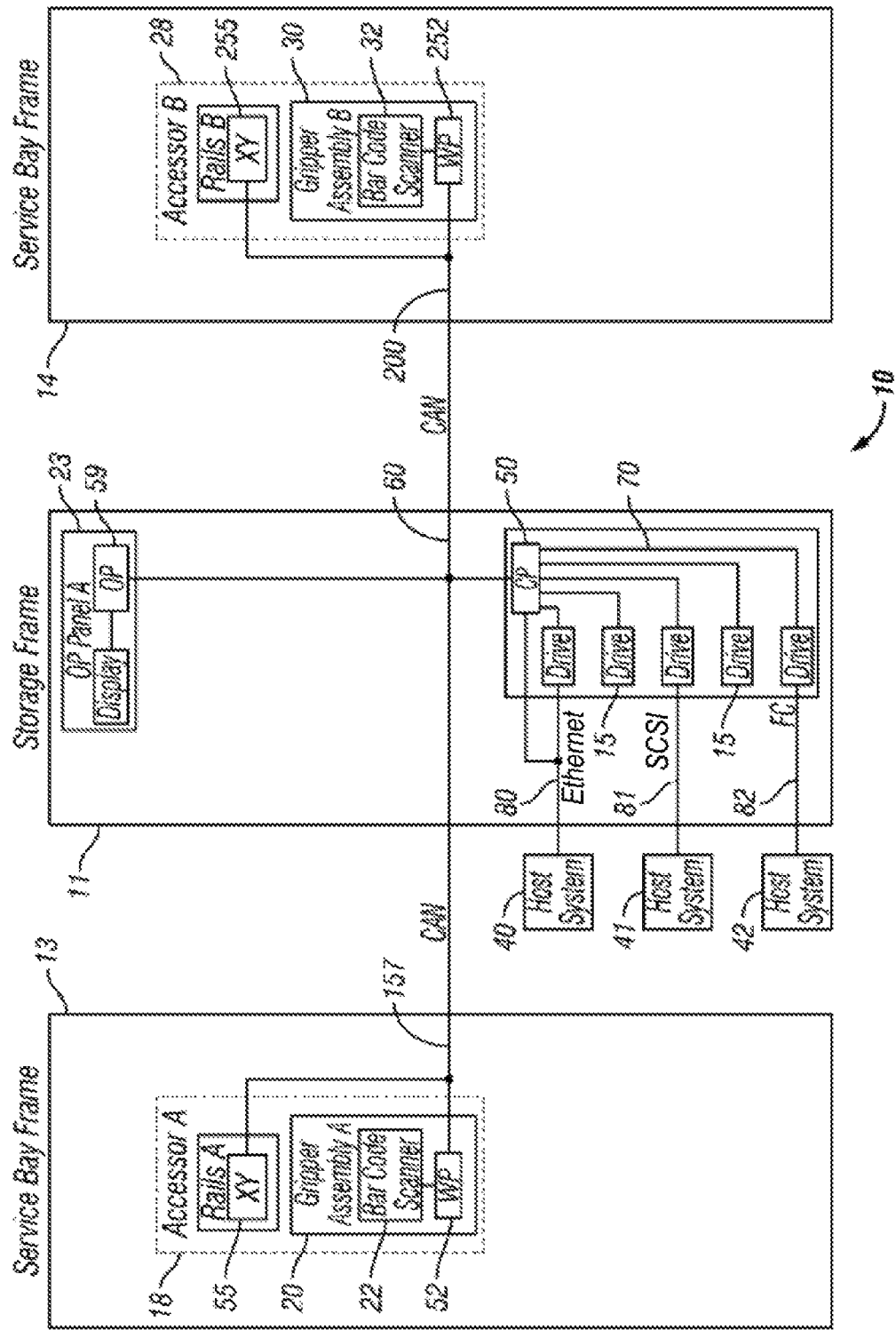
FIG. 3 is a schematic diagram of one embodiment of an automated data storage library.

Referring now to FIG. 3, the automated data storage library 10 as described in reference to FIGS. 1A & 1B and FIG. 2, is depicted according to one embodiment. According to a preferred approach, the library 10 may employ a controller, e.g., arranged as a distributed system of modules with a plurality of processor nodes.

In one approach, the library is controlled, not by a central controller, but rather, by a distributed control system for receiving logical commands and converting the commands to physical movements of the accessor and gripper, and for operating the drives in accordance with the desired physical movements. The distributed control system may also provide logistical support, such as responding to host requests for element status, inventory, library status, etc. The specific commands, the conversion of those commands to physical movements of the accessor, gripper, controllers, and other components, and the operation of the drives may be of a type known to those of skill in the art.

While the automated data storage library 10 has been described as employing a distributed control system, various other approaches described and/or suggested herein may be implemented in automated data storage libraries regardless of control configuration, such as, but not limited to, an automated data storage library having one or more library controllers that are not distributed.

With continued reference to FIG. 3, library 10 receives commands from one or more host systems 40, 41, 42. The host systems 40, 41, 42, such as host servers, communicate with the library directly, e.g., on line 80 (e.g., path), through one or more control ports (not shown), or through one or more data storage drives 15 on paths 81, 82. Thus, in different approaches, the host systems 40, 41, 42 may provide commands to access particular data storage cartridges and move the cartridges, for example, between the storage slots 16, the deep slot cells 100, and the data storage drives 15. The commands are typically logical commands identifying the data storage cartridges or data storage cartridge media, and/or logical locations for accessing the media. Furthermore, it should be noted that the terms "commands" and "work requests" are used interchangeably herein to refer to such communications from the host system 40, 41, 42 to the library 10 as are intended to result in accessing particular data storage media within the library 10 depending on the desired approach.

According to one embodiment, the library 10 may be controlled by a library controller. Moreover, in various approaches, the library controller may include a distributed control system receiving the logical commands from hosts, determining the required actions, and/or converting the actions to physical movements of the first and/or second accessors 18, 28 and/or gripper assemblies 20, 30. In another approach, the distributed control system may have a plurality of processor nodes, each having one or more computer processors. According to one example of a distributed control system, a communication processor node 50 may be located in a storage frame 11. The communication processor node provides a communication link for receiving the host commands, either directly or through the drives 15, via at least one external interface, e.g., coupled to line 80.

As illustrated in FIG. 3, the communication processor node 50 is coupled to each of the data storage drives 15 of a storage frame 11, via lines 70, and may communicate with the drives 15 and with host systems 40, 41, 42. Alternatively, the host systems 40, 41, 42 may be directly coupled to the communication processor node 50, at line 80 (e.g., input) for example, or to control port devices (not shown) which connect the library to the host system(s) with a library interface similar to the drive/library interface. As is known to those of skill in the art, various communication arrangements may be employed for communication with the hosts and with the data storage drives. In the example of FIG. 3, lines 80 and 81 are intended to be Ethernet and a SCSI bus, respectively, and may serve as host connections. However, path 82 comprises an example of a Fibre Channel bus which is a high speed serial data interface, allowing transmission over greater distances than the SCSI bus systems.

According to some approaches, the data storage drives 15 may be in close proximity to the communication processor node 50, and may employ a short distance communication scheme, such as Ethernet, or a serial connection, such as RS-422. Thus, the data storage drives 15 may be individually coupled to the communication processor node 50 by lines 70. Alternatively, the data storage drives 15 may be coupled to the communication processor node 50 through one or more networks.

Furthermore, additional storage frames 11 may be provided, whereby each is preferably coupled to the adjacent storage frame. According to various approaches, any of the additional storage frames 11 may include communication processor nodes 50, storage slots 16, storage cells 100, data storage drives 15, networks 60, etc.

An automated data storage library 10 typically comprises one or more controllers to direct the operation of the automated data storage library. Moreover, host computers and data storage drives typically include similar controllers. A library controller may take many different forms and may comprise, for example, but is not limited to, an embedded system, a distributed control system, a personal computer, a workstation, etc. The term "library controller" as used herein is intended in its broadest sense as a device that includes at least one processor, and optionally further circuitry and/or logic, for controlling and/or providing at least some aspects of library operations.

Figure 4:
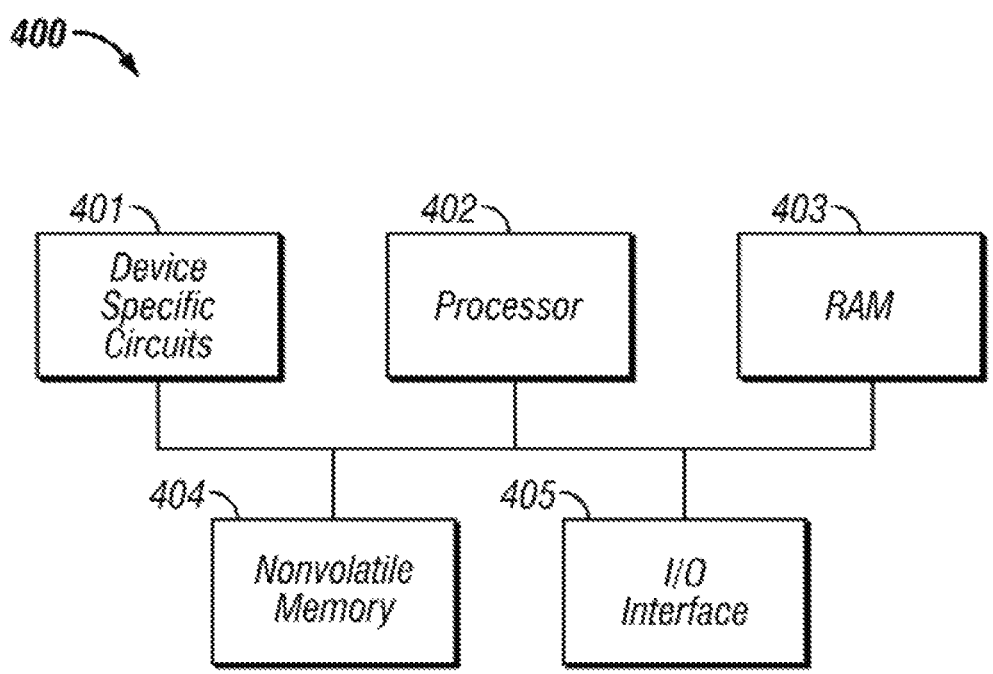
FIG. 4 is a block diagram depicting a controller configuration according to one embodiment.

Referring now to FIG. 4, a typical controller 400 is shown with a processor 402, Random Access Memory (RAM) 403, nonvolatile memory 404, device specific circuits 401, and I/O interface 405. Alternatively, the RAM 403 and/or nonvolatile memory 404 may be contained in the processor 402 as could the device specific circuits 401 and I/O interface 405. The processor 402 may comprise, for example, an off-the-shelf microprocessor, custom processor, Field Programmable Gate Array (FPGA), Application Specific Integrated Circuit (ASIC), discrete logic, etc. The RAM 403 is typically used to hold variable data, stack data, executable instructions, etc.

According to various approaches, the nonvolatile memory 404 may comprise any type of nonvolatile memory such as, but not limited to, Electrically Erasable Programmable Read Only Memory (EEPROM), flash Programmable Read Only Memory (PROM), battery backup RAM, hard disk drives, etc. However, the nonvolatile memory 404 is typically used to hold the executable firmware and any nonvolatile data containing programming instructions that can be executed to cause the processor 402 to perform certain functions.

In some embodiments, the I/O interface 405 may include a communication interface that allows the processor 402 to communicate with devices external to the controller. Examples of the communication interface may comprise, but are not limited to, serial interfaces such as RS-232, USB (Universal Serial Bus), Small Computer Systems Interface (SCSI), RS-422 or a wireless communication interface such as Wi-Fi, Bluetooth, near-field communication (NFC) or other wireless interfaces. The controller 400 may communicate with an external device via the communication interface 405 in any communication protocols such as Automation/Drive Interface (ADI).

The device specific circuits 401 provide additional hardware to enable the controller 400 to perform unique functions including, but not limited to, motor control of an accessor cartridge gripper. Moreover, the device specific circuits 401 may include electronics that provide, by way of example but not limitation, Pulse Width Modulation (PWM) control, Analog to Digital Conversion (ADC), Digital to Analog Conversion (DAC), etc. In addition, all or part of the device specific circuits 401 may reside outside the controller 400.

While the automated data storage library 10 is described as employing a distributed control system, the various approaches described and/or suggested herein may be implemented in various automated data storage libraries regardless of control configuration, including, but not limited to, an automated data storage library having one or more library controllers that are not distributed. Moreover, a library controller may comprise one or more dedicated controllers of a library, depending on the desired embodiment. For example, there may be a primary controller and a backup controller. In addition, a library controller may comprise one or more processor nodes of a distributed control system. According to one example, communication processor node 50 (e.g., of FIG. 3) may comprise the library controller while the other processor nodes (if present) may assist the library controller and/or may provide backup or redundant functionality. In another example, communication processor node 50 and work processor node 52 may work cooperatively to form the library controller while the other processor nodes (if present) may assist the library controller and/or may provide backup or redundant functionality. Still further, all of the processor nodes may comprise the library controller. According to various approaches described and/or suggested herein, a library controller may have a single processor or controller, or it may include multiple processors or controllers, or multiple cores in a processor chip.

Figure 5:
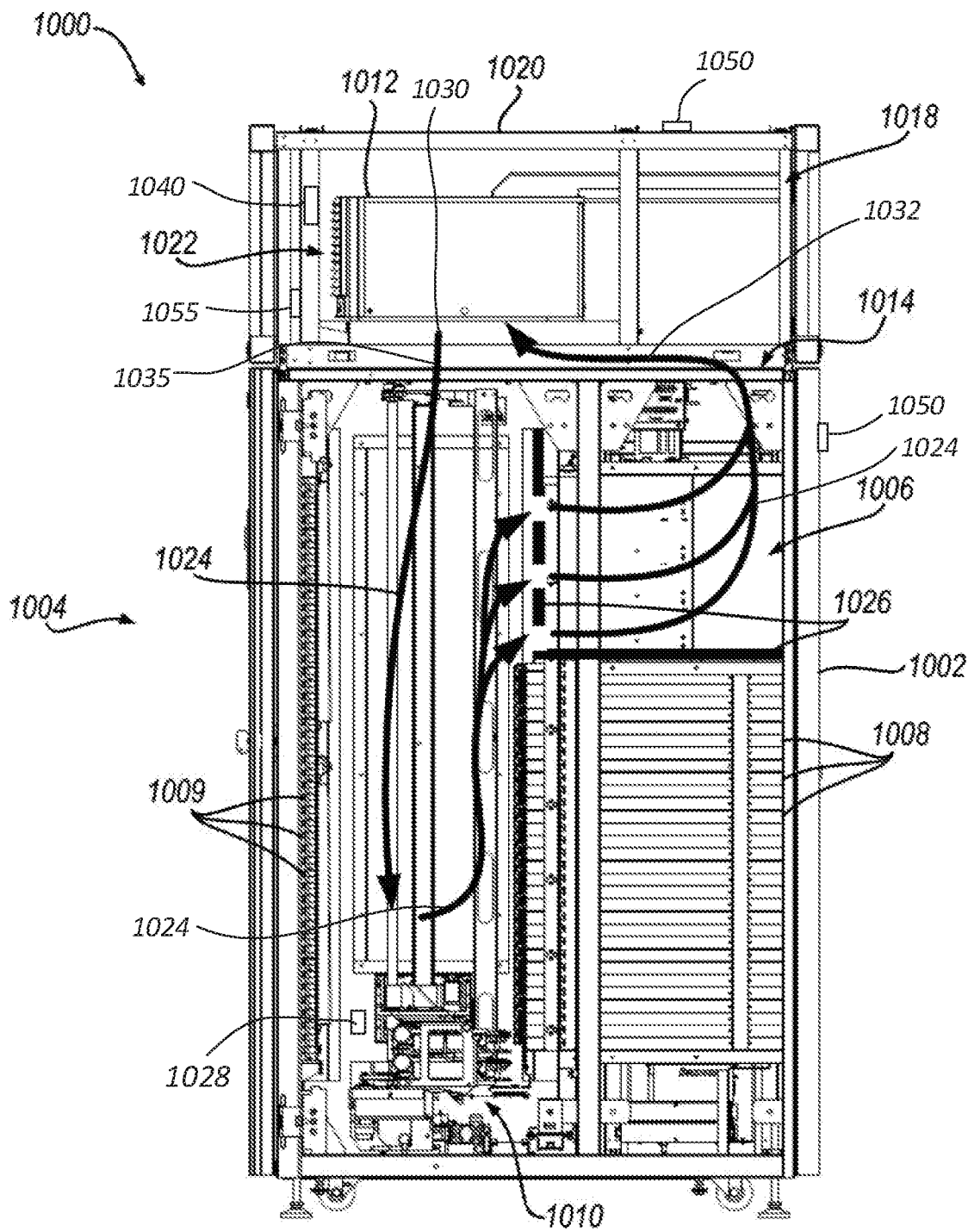
FIG. 5 is a partial side view of one embodiment of a system for storing magnetic recording media.

Referring now to FIG. 5, a system 1000 includes a frame 1002 of an automated data storage library 1004. As described above, automated libraries are typically used to store cartridges and drives in large arrays to store large amounts of data. Thus, an interior of frame 1002 is illustrated as a tape library in one embodiment, and is depicted as including one or more tape drives 1006, an area for storing tape cartridges (e.g., multi-cartridge deep slot cells 1008 and single cartridge storage slots 1009), and a robotic accessor 1010, among other components which would be apparent to one skilled in the art upon reading the present description (e.g., see FIG. 2 above).

System 1000 further includes an optional environmental conditioning unit 1012 associated with the frame 1002. The environmental conditioning unit 1012 may be integrated with and coupled to frame 1002. For the purposes of the present disclosure, it is to be understood that an environmental conditioning unit may be any device which conditions the air and/or the surrounding environment and is able to change the environmental conditions. The environmental conditions may include (but are not limited to) temperature, humidity, pressure, etc. In one embodiment, the environmental conditioning unit may be an air-conditioning unit. In other embodiments, the environmental conditioning unit may be a thermo-electric heater, a thermo-electric cooler, an electric heater, a liquid heater, a liquid cooler, a heat pump, an evaporative cooler, an ionizer, a de-ionizer, a humidifier, a dehumidifier, one or more fans, or any combination thereof. An environmental conditioning unit in accordance with one embodiment of the present disclosure may increase or decrease the temperature, humidity, pressure, etc. The environmental conditioning unit 1012 may be coupled to an upper surface 1014 (e.g., the roof) of the frame 1002 as shown in FIG. 1B and FIG. 5. The environmental conditioning unit 1012 preferably operates without negatively affecting the operating conditions in the frame 1002. Alternatively, an environmental conditioning unit may be functionally associated with the frame 1002 by positioning the environmental conditioning unit elsewhere and using ducts to route the air to the interior of the frame 1002, coupling the environmental conditioning unit to a side of the frame 1002, coupling the environmental conditioning unit to a bottom of the frame 1002 (underneath the frame 1002), etc., depending on the desired approach.

The environmental conditioning unit 1012 is preferably configured such that it may adjust, change and/or regulate the relative conditions (e.g., temperature, humidity, contaminant presence via filtering, etc.) inside the frame 1002. Thus, according to different approaches, the environmental conditioning unit may be able to reduce the temperature of the interior of the frame 1002 and/or reduce the relative humidity of the interior of the frame 1002, depending on the type of environmental conditioning unit 1012 employed. The environmental conditioning unit 1012 is preferably configured to turn on and off as desired to maintain a selected temperature and/or humidity in the interior of the frame 1002. Alternatively, the environmental conditioning unit may have a fan and the fan can be left always on to keep air circulating within the interior of the frame. In one embodiment, the environmental conditioning unit may be an air conditioning unit and the fan may be continuously on and the condenser may turn on and off to maintain a selected temperature and/or humidity in the interior of the frame 1002.

As would be appreciated by one skilled in the art, the environmental conditioning unit 1012 may be an air conditioning unit and may be able to adjust the relative temperature and/or humidity of the interior of the frame 1002 in a conventional manner. Cold air may flow into the interior of the frame 1002 via an inlet air duct 1030 which may connect the environmental conditioning unit 1012 to the interior of the frame 1002, and form an inlet 1035 in the upper surface 1014 of the frame 1002. Specifically, an inlet air duct 1030 may direct the air cooled by the environmental conditioning unit 1012 into the interior of the frame 1002, e.g., where the majority of the data storage media may be stored. As a result, air flow is created from the environmental conditioning unit 1012 to the interior of the frame 1002, as indicated by arrows 1024. This air flow may be induced by a fan included in the environmental conditioning unit 1012 and/or by using the fans in the one or more tape drives 1006 in the frame 1002. Although the air flow is preferably directed from the environmental conditioning unit 1012 to the interior of the frame 1002, and from the interior of the frame 1002 back to the environmental conditioning unit 1012, the particular path that the air flow is shown as extending along in the present embodiment by arrows 1024 is in no way intended to limit the disclosure or the invention.

With continued reference to FIG. 5, system 1000 may include an enclosure 1020 for the environmental conditioning unit 1012. An additional fan 1040 may be included in the enclosure 1020 for passing ambient air over external components of the environmental conditioning unit 1012 to further promote heating, cooling and/or conditioning of the air. Moreover, the enclosure 1020 may include an opening, a baffle or baffles, etc. to direct ambient air exterior to the library 1004 toward an inlet 1022 of the environmental conditioning unit 1012.

In one embodiment, any vents, voids, seams, etc. in the frame 1002 of the library 1004, other than inlet 1035 and an outlet 1032 in an upper surface 1014 of the frame 1002, are preferably sealed such that air from outside the frame 1002 is restricted from entering the interior thereof. The frame 1002 may be sealed using any processes which would be apparent to one skilled in the art upon reading the present description, e.g., including but not limited to inserting foam, implementing insulating seals, etc. New frames may be built without any vents, voids, seams, etc. The housing and panels enclosing the frame 1002 may also be insulated to prevent or inhibit unconditioned air from entering the frame 1002.

The frame 1002 may also include one or more environmental sensors 1050 exterior to the library 1004 and may also include one or more sensors 1055 exterior to the library 1004 but inside the enclosure 1020 for the environmental conditioning unit 1012. In one embodiment the sensors 1055 may be located in front of inlet 1022 of the environmental conditioning unit 1012. The environmental sensors 1050, 1055 may be any sensor appropriate for determining the environmental conditions at the sensor location, such as one or more temperature sensors, one or more humidity sensors, one or more pressure sensors, etc. The one or more environmental sensors 1050, 1055 may be in communication with a library controller, such as library controller 400 shown and described with respect to FIG. 4. The one or more signals provided by the environmental sensors 1050, 1055 may be utilized to control the output and operation of the environmental conditioning unit 1012. Although the embodiment illustrated in FIG. 5 includes a single frame 1002 and a single environmental conditioning unit 1012, other embodiments may include additional frames and/or environmental conditioning units.

System 1000 illustrated in FIG. 5 may further comprise one or more environmental sensors 1028 disposed within the interior of the library 1002. The environmental sensor(s) may be any appropriate sensor for determining the environmental conditions within the frame 1002, such as one or more temperature sensors, one or more humidity sensors, one or more pressure sensors, etc. The one or more environmental sensors 1028 may be in communication with a library controller, such as controller 400 shown and described with respect to FIG. 4. As such, the signal provided by the one or more environmental sensors 1028 may be utilized to control the output and operation of the environmental conditioning unit 1012.

Although the embodiment illustrated in FIG. 5 includes a single frame 1002 and a single environmental conditioning unit 1012, other embodiments may include additional frames and/or environmental conditioning units.

While a data storage library having an associated and/or integrated environmental conditioning unit advantageously controls the environmental conditions within the library, some challenges may exist when components within such a data storage library need to be serviced or replaced. As noted above, many data centers are maintained at higher temperatures and higher humidity levels to reduce the costs relating to cooling the data center. For this reason, environmental conditions within the data center may differ substantially from those within a data storage library having an associated environmental conditioning unit. As such, a component (e.g., a data storage drive, data storage cartridge, library control card, etc.) that is moved abruptly from the warm, humid environment outside the data storage library (e.g. the data center) to the cool, dry environment of the data storage library may develop condensation and/or moisture on surfaces thereof. Additionally, opening an access door to the data storage library may also introduce air from the data center into the conditioned environment of the data storage library, potentially causing condensation formation and/or accumulation on various surfaces within the data storage library. Condensation formation on surfaces of sensitive components such as data storage cartridges and drives for reading data storage media is undesirable, as moisture may lead to adverse effects, and, in extreme situations, failure of the components and/or data loss.

Thus, in accordance with aspects of the present disclosure, a data storage library capable of entering a distinct service mode is provided. The service mode may be initiated prior to allowing a technician or other personnel to enter into the interior of the library to service and/or replace one or more library components. Upon initiation of the service mode, the environmental conditions (e.g., temperature and/or humidity) within the data storage library may be adjusted to be closer to the environmental conditions present outside of the library. In this way, the interior of the data storage library may be accessed through a door or other entry point, but with a reduced possibility for the formation of condensation on or within the sensitive components of the data storage library.

Figure 6:
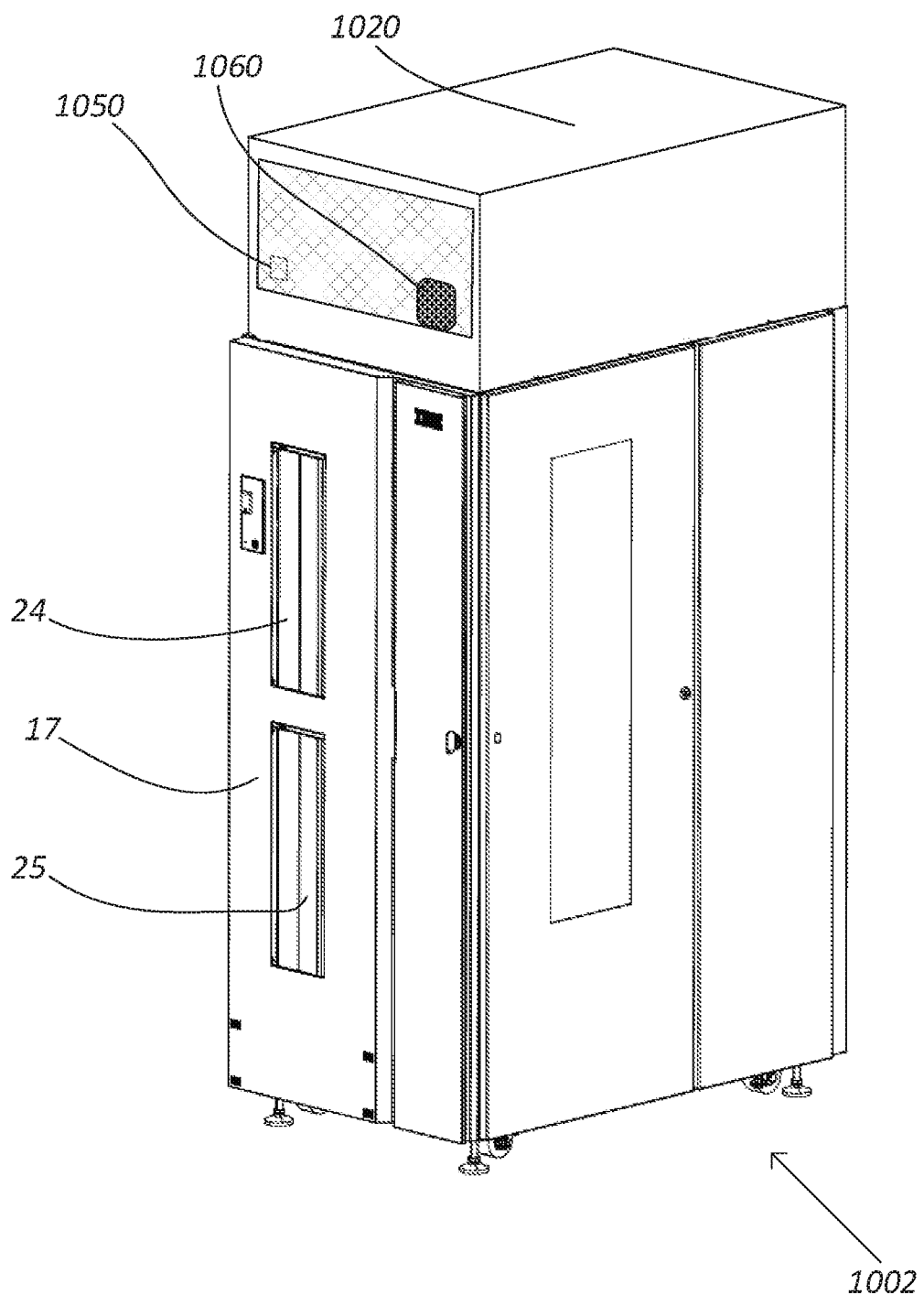
FIG. 6 is a front perspective view of one embodiment of a storage frame from a data storage library.
Figure 7:
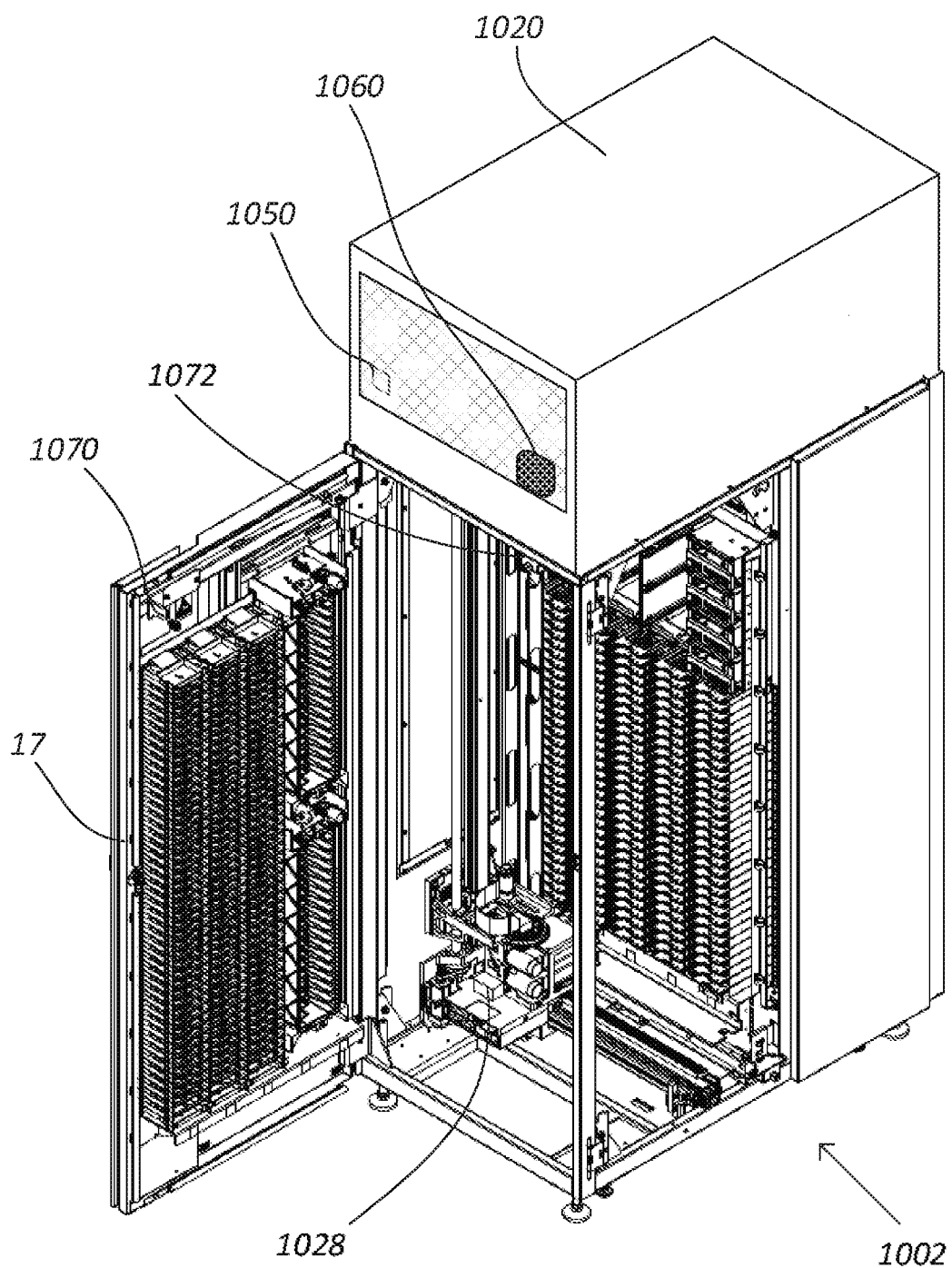
FIG. 7 is an internal view of the storage frame of FIG. 6.

Referring to FIGS. 6-7, front perspective views of a storage frame 1002 in accordance with an aspect of the disclosure are illustrated. As described above with respect to FIG. 5, frame 1002 comprises one or more data storage drives, one or more cartridge slots, one or more multi-cartridge deep slot storage cells, and at least one accessor, all of which are at least partially accessible via a front door 17 (as similarly shown in FIG. 2). In one embodiment, the data storage library is a tape library that includes one or more tape drives, a plurality of tape cartridges, one or more cartridge slots, one or more optional multi-cartridge deep slot storage cells and at least one accessor. Front door 17 may be hinged to a portion of frame 1002 so as to form an access door to the interior of frame 1002, as shown in FIG. 7. An enclosure 1020 on the top portion of frame 1002 preferably is configured to house an environmental conditioning unit, which provides conditioned air to the interior of frame 1002, as described above with respect to FIGS. 1B and 5. As is also described above with respect to FIG. 5, the environmental conditioning unit on frame 1002 enables the interior of frame 1002 to be maintained within desired operational environmental conditions, while the surrounding environmental conditions of the data center may be less controlled, if controlled at all, and may be outside the desired operational conditions of the data storage library. Accordingly, in some instances, the environmental conditions within frame 1002 and the environmental conditions outside of frame 1002 may vary significantly. While the data storage library system in FIGS. 6-7 is shown as a single storage frame 1002, it will be appreciated that the data storage library may include multiple storage frames, service bays and optional environmental conditioning units similar to FIGS. 1A and 1B.

Similar to frame 11 described above with respect to FIGS. 1-2, frame 1002 may also comprise an operator panel (not shown), an upper import/export (I/O) station 24, and/or a lower I/O station 25. The operator panel, such as operator panel 23 shown and described with respect to FIGS. 1 and 3, may provide a technician an interface for communicating with a library controller, such as controller 400 shown and described with respect to FIG. 4. The operator panel may comprise a visual display and/or one or more light indicators (e.g., LEDs) so as to provide the technician with a visual indication of operational information of the data storage library. Upper I/O station 24 and a lower I/O station 25 may be configured to allow data storage cartridges to be added (e.g., inserted) to the library inventory and/or removed from the library without having to open front door 17 or otherwise disrupt library operations.

While I/O stations 24, 25 may enable data storage cartridges to be added to and/or removed from the library without the opening of front door 17, other maintenance procedures may require front door 17 to be opened for technician access. However, as described above, the opening of front door 17 and/or I/O stations 24, 25 may introduce environmental conditions from the data center into the interior of the data storage library, potentially causing the formation of condensation on sensitive componentry within the data storage library due to the disparate environmental conditions of the data center and the data storage library. As such, embodiments of the disclosure comprise a service mode under which the system may be placed prior to enabling front door 17 (or any other access panel or opening, e.g., I/O stations 24,25) to be opened. The service mode may be initiated by a technician or other personnel via, for example, an operator panel or other interface associated with the frame 1002 at a time prior to a service procedure being initiated.

When placed into the service mode, the environmental conditioning unit 1012 may operate to regulate the interior environmental conditions of the library such that the conditions within the library (e.g., temperature and/or humidity) may be adjusted toward the environmental conditions exterior to the library, while still remaining within the environmental operational limits of the components within the library. For example, the environmental conditioning unit 1012 may typically regulate the temperature within the frame 1002 to be between a recommended operational temperature (e.g., 64°-80° F.), and may regulate the relative humidity within the frame 1002 to be at or below a certain threshold (e.g., 60% relative humidity). However, a wider temperature range (e.g., 60°-90° F.) and relative humidity range (e.g., 20%-80%) may still fall within the allowable operational limits of the components of the data storage library, particularly for a short period of time.

As noted above, the temperature and/or humidity conditions outside of the frame 1002 (i.e., within the data center) are often higher than the temperature and/or humidity conditions within the interior of the frame 1002. However, in certain locations and environments, it is to be understood that the external conditions (e.g., in the data center) may actually be lower than those within the frame 1002. During the service mode, the temperature and/or humidity conditions within the frame 1002 are gradually adjusted toward the external conditions by the environmental conditioning unit 1012.

For example, a data center may have an ambient temperature of 85° F. and a relative humidity of 75%, while the interior of the frame 1002 may be maintained at an operating temperature of 70° F. and 50% relative humidity. However, when a service mode is initiated, the environmental conditioning unit 1012 may gradually adjust temperature and/or humidity conditions within the interior of the frame 1002 to be at or near the exterior temperature and/or humidity conditions. Using the example above, the environmental conditioning unit 1012 may gradually increase the interior temperature of frame 1002 from 70° F. to about 85° F. Depending on the properties of environmental conditioning unit 1012, the relative humidity may increase from an initial 50% in the direction of the exterior relative humidity level of 75%. While an interior temperature of 85° F. and a relative humidity of 75% may be above the recommended operational environmental condition levels, such adjusted environmental condition levels in this scenario still fall within allowable levels of the data storage library when not in use, and may be within acceptable operational conditions for short term use, and thus the data read/write operations within the library should not be negatively affected by such a gradual, short-term change in environmental conditions during the service mode. One skilled in the art will appreciate that while the disclosure refers to the environmental conditioning unit actively adjusting up or increasing temperature, humidity, or other environmental condition, the environmental conditioning unit may act passively, for example, by shutting down or changing its operational parameters so that the desired interior environment conditions may be met. For example, environmental conditioning unit may not turn on at a lower duty cycle, and/or the temperature, humidity and/or other environmental condition may adjust through osmosis and heat transfer dynamics.

As the interior and exterior environmental conditions will be substantially similar after the above-mentioned service mode adjustments have been completed, the front door 17 (or any other access opening) on frame 1002 may be permitted to be opened for component service and/or replacement. The substantially similar environmental conditions help to resist and/or prevent an influx of warm, humid air from affecting the sensitive components within the frame 1002, whereas those same components may have been subject to the possible formation and/or accumulation of condensation thereon if the service mode adjustments to temperature and/or humidity were not made.

Upon completion of a service procedure during the service mode, the front door 17 (and/or other access opening) may be closed. With closure of the front door 17, the service mode may be automatically and/or manually terminated. That is, closure of front door 17 may itself trigger a sensor which signifies the end of the service mode, or the technician may manually indicate (e.g., via an operator panel) that the service mode is complete, at which point the environmental conditioning unit 1012 may switch back to its normal operational parameters and/or operate to gradually return the environmental conditions within the frame 1002 back to the previous levels. In this way, the elevated environmental condition levels within frame 1002 may only last the duration of the service procedure, thereby minimizing the amount of time that components within the frame 1002 are exposed to sub-optimal operational environmental conditions.

Additionally, the rate of change of the environmental conditions within the interior of frame 1002 before, during, and after completion of the service procedure may be monitored and/or controlled, regardless of whether the environmental conditions (e.g., temperature and/or humidity) are being increased or decreased. Accordingly, the service mode utilizes a controlled adjustment rate so as to avoid any component damage or contamination due to, e.g., condensation formation and/or accumulation caused by rapid changes in environmental conditions within the frame 1002. For example, the rate of temperature change may be limited to a maximum of between 40°-50° F./hr. Any greater rate of change may increase the risk of condensation formation and/or damage to sensitive components within frame 1002.

In order to determine the amount and/or rate of change in environmental conditions needed during the service mode of operation, one or more environmental sensors may be utilized to monitor environmental conditions both at the interior and the exterior of frame 1002. For example, frame 1002 may include one or more external environmental sensors 1050, which are configured to sense at least one environmental condition within the data center. Specifically, sensor(s) 1050 may sense the temperature and/or humidity within the data center. While FIGS. 6-7 show sensor(s) 1050 as being located on a front top portion of an enclosure 1020, it is to be understood that sensor(s) 1050 may be located on any external surface of frame 1002, and may be located remote from an external surface of frame 1002, and/or may be located elsewhere within the facility where the data storage library is located, e.g., at a location within the data center.

In addition to external sensor(s) 1050, at least one internal environmental sensor 1028 may be located within the interior of frame 1002, as shown in FIG. 5 and FIG. 7. Internal environmental sensor(s) 1028 may be configured to sense at least one environmental condition within the data storage library. For example, sensor(s) 1028 may sense the temperature and/or humidity within the data storage library. While sensor(s) 1028 is shown in FIG. 7 as being located on a robot accessor within frame 1002, it is to be understood that sensor(s) 1028 may be located at any location within frame 1002, and multiple sensors 1028 may be located at multiple locations within frame 1002, including on the robot accessor(s), on interior walls, etc.

Both external environmental sensor(s) 1050 and internal environmental sensor(s) 1028 may be configured to be in communication with a library controller, such as controller 400 shown and described with respect to FIG. 4. The library controller may be utilized to implement an algorithm or use a look-up table to compare the data received from the external environmental sensor(s) 1050 with the data received from the internal environmental sensor(s) 1028 so as to control the direction and rate of change of the environmental conditions within the frame 1002.

In accordance with another aspect of the disclosure, the controller may cause a warning indicator to be delivered to the technician during the service mode, warning the technician that conditions within the frame 1002 are not yet suitable for the front door 17 to be opened. For example, a warning communication, such as a text warning, light warning, and/or audible warning may be broadcast via the operator panel or at other locations. Alternatively, and/or additionally, a light indicator 1060 may be illuminated on frame 1002, with light indicator 1060 providing a visual warning to the operator that the front door 17 should not be opened due to dissimilar external and internal environmental conditions, including conditions outside the range of acceptable and/or desired conditions. While light indicator 1060 is shown on a front surface of the enclosure 1020, it is to be understood that light indicator 1060 may be located at any external location of frame 1002 and/or enclosure 1020. Furthermore, more than one light indicator 1060 may be utilized, and an audible indicator (including associated speaker or other audio reproduction means) may also be utilized. In one embodiment, an illuminated light indicator 1060 may warn the operator not to open the front door 17, while an unlit light indicator 1060 may alert the operator that the front door 17 may be opened for access to the interior of frame 1002. However, it is to be understood that an unlit light indicator 1060 may instead warn the operator that it would be undesirable to open the front door 17, while an illuminated light indicator 1060 may indicate that the front door 17 may safely be opened.

According to another aspect of the disclosure, a lock may be utilized in addition to, or in lieu of, the visual and/or audible indicators described above. Specifically, referring to FIG. 7, front door 17 comprises a male lock portion 1070, while frame 1002 comprises a female lock portion 1072 configured to interact with male lock portion 1070. One or both of male lock portion 1070 and female lock portion 1072 may be in electronic communication with the library controller. Prior to and/or during the service mode, if the difference between the external and internal environmental conditions are outside a desired and/or predetermined range (which may result in the formation and/or accumulation of condensation upon sensitive components within the frame 1002), the controller may communicate with one or more of male lock portion 1070 and female lock portion 1072 to lock front door 17 in a closed position, thereby preventing access to the interior of frame 1002. Alternatively, if it is determined that the external and internal environmental conditions are within a suitable differential range (i.e., less than or equal to a desired range and/or predetermined threshold), the controller may communicate with one or more of male lock portion 1070 and female lock portion 1072 to unlock front door 17, thereby enabling an technician to access the interior of frame 1002 in order to perform the desired service procedure. One or both of male lock portion 1070 and female lock portion 1072 may be moved into a locked/unlocked position via any appropriate mechanism, such as an electro-mechanical actuator or a solenoid. Additionally or alternatively, an accessor within the library may be configured to move a latch or other mechanism to ensure to that front door 17 is locked/unlocked. It will be appreciated that the male and female portions of the locking mechanism may be reversed, with the female portion associated with and/or coupled to the front door and the male portion associated with and/or coupled to the library frame.

In addition to the locking portions shown and described with respect to FIG. 7, the system may further comprise one or more visual and/or audible warning indicators, such as those described above with respect to FIG. 6. Further, while the locking portions are described as being respective "male" and "female" locking portions, it is to be understood that the locking mechanism(s) may be any appropriate locking mechanism(s), such as magnetic locks, dual hooks, etc.

Figure 8:
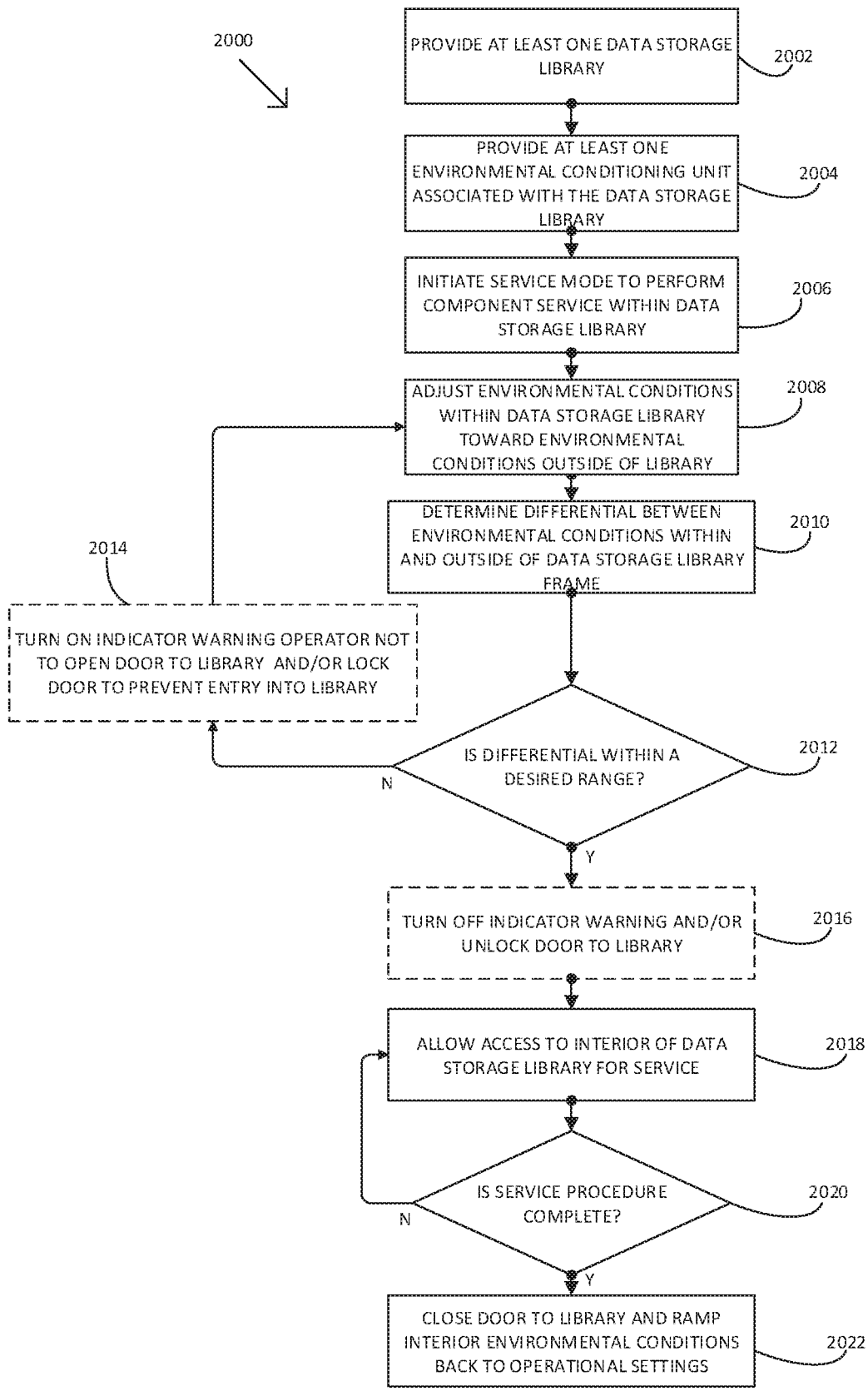
FIG. 8 is a flowchart of one embodiment of a method for providing a service mode for an automated data storage library.

Next, referring to FIG. 8, a service mode process 2000 for performing a service procedure within a data storage library in accordance with one aspect of the disclosure is illustrated. While process 2000 is described for the sake of convenience and not with the intent of limiting the disclosure as comprising a series and/or number of steps, it is to be understood that the process does not need to be performed as a series of steps and/or the steps do not need to be performed in the order shown and described with respect to FIG. 8, but may be performed as an integral process, a series of steps, in the order described or an alternative order.

At 2002, at least one data storage library is provided. At 2004, the at least one data storage library is provided with at least one environmental conditioning unit associated therewith, wherein the environmental conditioning unit is capable of controlling and/or regulating the temperature and/or humidity within the data storage library. At 2006, a service mode is initiated when component service and/or replacement is needed within the data storage library. As noted above, the service mode may be initiated automatically and/or manually. At 2008, one or more environmental conditions within the data storage library are adjusted toward the environmental conditions outside of the data storage library. As previously discussed, the one or more environmental conditions within the data storage library may either be increased (e.g., increase in temperature and/or humidity) or decreased (e.g., decrease in temperature and/or humidity), dependent upon the conditions present in the surrounding area (e.g., the data center).

The differential between the interior environmental conditions and the exterior environmental conditions are determined at 2010. At 2012, if the differential is determined to be outside of a predetermined suitable range, an indicator may be turned on, warning the operator not to open the door, and/or the door may be (or remain) locked at step 2014. As disclosed above, the indicator may be one or more of a visual indicator or audible indicator. However, if the differential is within a desired and/or suitable range, the indicator may be turned off and/or the door to the library may be unlocked at 2016. Accordingly, access into the interior of the data storage library frame(s) is allowed at 2018 for completion of the service procedure by a technician or other personnel.

Optionally, a determination may be made whether or not the service procedure is complete at 2020. If no, access into the interior of the data storage library for service and/or replacement of one or more components remains allowed. However, if yes, the door of the data storage library is closed, and the environmental conditioning unit is operated so as to adjust the environmental conditions within the interior of the data storage library back to an operational settings present prior to the service mode being initiated at 2022. In this way, the interior of data storage library may be conditioned to be within recommended operational conditions of the components contained therein when the library is not in a service mode. Alternatively, the door to the data storage may be closed indicating that service is completed and/or the technician may signal that the service is complete, for example, by pressing a button on the operator panel.

It follows that various embodiments described and/or suggested herein are able to provide data storage systems, more specifically, automated data storage libraries having climate control capabilities associated and/or integrated with the automated data storage library, with a service mode for regulating the interior environmental conditions within the data storage library based on the corresponding external environmental conditions and/or regulating access to the interior of the data storage library based on internal and external environmental conditions. As a result, favorable conditions (e.g., temperature, humidity, presence of contaminants, etc.) may be maintained for the data storage drives, data storage cartridges, etc., which may be stored in the library frames, while the formation and/or accumulation of condensation on the data storage library components may be inhibited, resisted and/or avoided.

The present invention may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

A data processing system suitable for storing and/or executing program code may include at least one processor, which may be or be part of a controller, coupled directly or indirectly to memory elements through a system bus, such as controller 400 of FIG. 4. The memory elements can include local memory employed during actual execution of the program code, such as nonvolatile memory 404 of FIG. 4, bulk storage, and cache memories which provide temporary storage of at least some program code in order to reduce the number of times code must be retrieved from bulk storage during execution.

It will be clear that the various features of the foregoing systems and/or methodologies may be combined in any way, creating a plurality of combinations from the descriptions presented above.

It will be further appreciated that embodiments of the present disclosure may be provided in the form of a service deployed on behalf of a customer to offer service on demand.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A data storage library system, the system comprising:
a data storage library, the data storage library comprising at least one library frame;
at least one environmental conditioning unit associated with the data storage library and configured to control one or more interior environmental conditions within the at least one library frame;
at least one access door for providing access to an interior portion of the at least one library frame;
a library controller; and
at least one environmental condition sensor at an interior location of the at least one library frame and at least one environmental condition sensor at an exterior location of the at least one library frame,
wherein the library controller is configured to determine if the at least one access door should be in the closed position based on information received from the at least one environmental condition sensor at the interior location of the at least one library frame and at least one environmental condition sensor at the exterior location of the at least one library frame.

2. The data storage library system of claim 1, wherein the library controller is configured to initiate a service mode prior to or during a service procedure performed within the at least one library frame, and further wherein the service mode comprises configuring the at least one environmental conditioning unit to adjust the one or more environmental conditions within the at least one library frame toward one or more exterior environmental conditions outside of the data storage library during the service mode.

3. The data storage library system of claim 1, wherein the at least one environmental condition sensor at the interior location and the at least one environmental condition sensor at the exterior location consist of at least one of a temperature sensor and a humidity sensor and combinations thereof.

4. The data storage library of claim 1, wherein the library controller is configured to determine a differential between at least one environmental condition at the interior location of the one or more library frames and at least one corresponding environmental condition at the exterior location of at least one library frame, and, if the differential is within a desired range, permit access into the at least one library frame via the at least one access door.

5. The data storage library system of claim 1, further comprising at least one warning indicator associated with the data storage library, wherein the at least one indicator is configured to provide an indication to an operator when the at least one access door should be in the closed position.

6. The data storage library system of claim 3, wherein the at least one warning indicator is at least one of the group consisting of a visual indicator, an audible indicator, and combinations thereof.

7. The data storage library system of claim 6, wherein the at least one warning indicator is a light visible from the exterior of the one or more library frames.

8. The data storage library system of claim 1, wherein the library controller is further configured to instruct the at least one environmental conditioning unit to adjust the one or more environmental conditions within the at least one library frame back to an operational setting upon completion of the service mode.

9. The data storage library of claim 1, further comprising at least one lock associated with the at least one access door and in electronic communication with the library controller, wherein the at least one lock is configured to prevent access into the interior portion of at least one library frame during at least a period of the service mode.

10. A system comprising:
a data storage library;
at least one environmental conditioning unit associated with the data storage library and configured to control one or more interior environmental conditions within the data storage library;
at least one access door for providing access to an interior portion of the data storage library;
a library controller; and
wherein the library controller is configured to initiate a service mode prior to or during a service procedure performed within the data storage library, wherein the service mode comprises configuring the at least one environmental conditioning unit to adjust the one or more environmental conditions within the at least one library frame toward one or more exterior environmental conditions outside of the data storage library, and
wherein the library controller during the service mode is configured to determine whether or not the at least one access door should be opened.

11. The data storage library of claim 10, wherein the determination of whether or not the at least one access door should be opened is based upon a differential between at least one environmental condition within the interior portion of the at least one library frame and at least one corresponding environmental condition exterior of the at least one library frame during the service mode.

12. The data storage library system of claim 10, further comprising at least one environmental condition sensor at an interior location of the data storage library and at least one environmental condition sensor at an exterior location of the data storage library.

13. The data storage library system of claim 12, wherein the at least one environmental condition sensor at the interior location and the at least one environmental condition sensor at the exterior location comprise at least one of a temperature sensor and a humidity sensor, and combinations thereof.

14. The data storage library of claim 10, wherein the library controller is configured to determine a differential between at least one environmental condition within the interior portion of the at least one library frame and at least one corresponding environmental condition exterior of the at least one library frame during the service mode and, if the differential is not within a desired range, determine that the at least one access door should not be opened.

15. The data storage library of claim 14, wherein the library controller is configured to determine the differential based on information received from the at least one environmental condition sensor at the interior location of the data storage library and at least one environmental condition sensor at the exterior location of the data storage library frame.

16. The data storage library of claim 14, wherein if the controller determines that the differential is not within a desired range, lock the at least one access door with at one lock.

17. The data storage library of claim 14, further comprising at least one lock associated with the at least one access door and in electronic communication with the library controller, and wherein if it the differential is not within the desired range, the at least one access door is locked.

18. The data storage library of claim 14, wherein, if the differential is within the desired range, the library controller is configured to unlock the at least one access door so as to enable access to the interior of the data storage library.

19. The data storage library of claim 14, further comprising at least one warning indicator associated with the data storage library, wherein the at least one indicator is configured to provide an indication to an operator when the at least one access door should not be opened, the at least one warning indicator comprising at least one of the group consisting of a visual indicator, an audible indicator, and combinations thereof, wherein, if the differential is not within the desired range, the warning indicator is activated.

20. A method of servicing a data storage library, the method comprising:
providing a data storage library having at least one library frame;
providing at least one environmental conditioning unit configured to control at least one environmental condition within the at least one library frame;
adjusting at least one environmental condition within the at least one library frame toward at least one external environmental condition outside of the data storage library;
determining if a differential between the at least one environmental condition within the at least one library frame and the at least one external environmental condition outside of the data storage library is within a desired range; and
providing an indicator to warn an operator when the differential is not within the desired range, wherein the indicator is at least one of the group consisting of a visual indicator, an audible indicator, and combinations thereof.

* * * * *